United States Patent [19]

Tanimura et al.

[11] 3,951,887

[45] Apr. 20, 1976

[54] ADHESION OF RUBBER TO REINFORCING MATERIALS

[75] Inventors: Syozo Tanimura; Masahiko Harada, both of Minoo; Ryohei Tsuyama, Toyonaka, all of Japan

[73] Assignee: Sumitomo Chemical Company, Limited, Osaka, Japan

[22] Filed: Feb. 15, 1974

[21] Appl. No.: 443,002

[30] Foreign Application Priority Data
Feb. 16, 1973 Japan............................. 48-19616

[52] U.S. Cl................................... 260/3; 156/331; 156/334; 156/335; 428/474; 428/495; 428/502; 260/839; 260/845; 260/846; 260/852

[51] Int. Cl.²..................... C09J 3/14; C09J 3/16; C08L 9/00; C08L 61/28

[58] Field of Search............... 260/3, 839, 852, 845, 260/846

[56] References Cited
UNITED STATES PATENTS

| | | | |
|---|---|---|---|
| 3,194,294 | 7/1965 | Van Gils | 260/845 |
| 3,366,583 | 1/1968 | Wilson | 260/852 |
| 3,522,127 | 7/1970 | Osborne et al. | 260/852 |
| 3,553,115 | 1/1971 | Curchod et al. | 260/3 |
| 3,596,696 | 8/1971 | Freytag et al. | 260/852 |
| 3,715,172 | 2/1973 | Dembowski et al. | 260/852 |

*Primary Examiner*—John C. Bleutge
*Attorney, Agent, or Firm*—Stewart and Kolasch, Ltd.

[57] ABSTRACT

A vulcanizable rubber composition which comprises a rubber component, a formaldehyde-donor and a formaldehyde-acceptor in a proportion of 100 : 0.1–10 : 0.1–10 by weight, the formaldehyde-donor being a methylolmelamine condensate containing as a major component 3 to 8 oligomers of a methylolmelamine which the formaldehyde-acceptor being resorcinol or its reaction product with formaldehyde, and is useful for achievement of the excellent adhesion of rubber to reinforcing materials simultaneously with vulcanization.

11 Claims, No Drawings

ADHESION OF RUBBER TO REINFORCING MATERIALS

The present invention relates to adhesion between rubber and reinforcing materials.

In the preparation of rubber articles such as tires, belts, and hoses whose rubber must be reinforced with reinforcing materials, adhesion between the rubber and the reinforcing materials often becomes a problem.

Adhesion has conventionally been carried out by pre-treating reinforcing materials with certain adhesives. In recent years, however, the so-called "compounding adhesion" has attracted the attention of the industry. Thus, certain chemicals called "compounding adhesives" are incorporated into rubber on compounding of various ingredients thereby increasing the adhesiveness between the reinforcing materials and rubber irrespective of whether the reinforcing materials are pretreated with adhesives or not.

Namely, the term compounding adhesion means a method for realizing the adhesion between rubber and reinforcing materials simultaneously with vulcanization by the use of a vulcanizable rubber composition obtained by compounding the following components into a rubber component separately or in a pre-mixture thereof: (1) the so-called "formaldehyde-acceptor" such as m-disubstituted benzenes (e.g. resorcinol, m-aminophenol, m-cresol, m-phenylenediamine) and their reaction products with aldehyde compounds (e.g. formaldehyde, acetaldehyde), and (2) the so-called "formaldehyde-donor" which generates formaldehyde by its decomposition on vulcanization.

As the formaldehyde-donor, there are known hexamethylolmelamine hexamethyl ether (Japanese Patent Publication No. 16421/1965), partial ethers of hexamethylolmelamine (Japanese Patent Publication No. 27463/1970), polymethylolmelamines containing not more than 5 methylol groups per molecule and ethers thereof (Japanese Patent Publication No. 7640/1972), etc.

These formaldehyde-donors, however, have various disadvantages which limit the practice of the compounding adhesion and make difficult its practical application. For example, polymethylolmelamines such as pentamethylolmelamine, tetramethylolmelamine and trimethylolmelamine very easily release formaldehyde by heat. That is, the temperature at which the release occurs is so low that these compounds are extremely poor in imparting of adhesiveness not only in the high temperature compounding wherein formaldehyde-acceptors and formaldehyde-donors are simultaneously compounded with rubber components at high temperatures (commonly 100° to 120°C) close to vulcanizing temperatures (usually 140° to 160°C), but also in the low temperature compounding wherein formaldehyde-acceptors are first compounded with rubber components at high temperatures (usually 100° to 120°C) followed by cooling down to 50° to 70°C, and then formaldehyde-donors are compounded therein followed by re-heating to vulcanizing temperatures. Consequently, these compounds have not been used in practice.

In order to realize the release of formaldehyde at higher temperatures, there have been made some proposals including etherification or esterification of methylol groups in polymethylolmelamines. However, etherification or esterification of all or most methylol groups causes over-raising of the temperatures at which the release of formaldehyde takes place thereby giving little or no improvement in adhesiveness.

On the other hand, when the etherification or esterification is carried out partially, the improvement in adhesiveness is attained only in case of the relatively low temperature compounding at 50° to 70°C, and not in case of the high temperature compounding. Thus, polymethylolmelamines and their partially etherified or esterified derivatives have been found to be very difficult to impart an excellent adhesiveness in both the low temperature and the high temperature compoundings.

Even with the partially etherified or esterified derivatives of polymethylolmelamines, the simultaneous compounding of them with the formaldehyde-acceptors such as resorcinol and its reaction product with formaldehyde can not be carried out in the high temperature compounding which is essential for dissolution and uniform dispersion of the acceptors, because they release formaldehyde at low temperatures. For this reason, their use requires a troublesome two-stage process in which the formaldehyde-acceptors are first compounded at a high temperature of 100° to 120°C followed by cooling, and then the formaldehyde-donors are compounded at a low temperature of 50° to 70°C followed by heating up to a vulcanizing temperature, thereby causing a remarkable decrease of operation efficiency.

Further, most of the etherified or esterified derivatives of polymethylolmelamines have a viscous liquid form, and so much labor is required in the handling, thereof i.e. not only for weighing and transporting but also for rubber compounding.

As the result of and extensive study, it has now been found that a vulcanizable rubber composition comprising a methylolmelamine condensate as a formaldehyde-donor can assure an excellent adhesiveness of rubber to reinforcing materials not only in the low temperature compounding but also in the high temperature compounding procedure. Since the condensation of methylolmelamines can be readily accomplished by heating under certain conditions, it is much more advantageous than the etherification or esterification of methylolmelamines. Further, methylolmelamine condensates can be obtained in the powder form by drying and therefore their handling is quite easy.

According to the present invention, there is provided a vulcanizable rubber composition comprising a rubber component, a formaldehyde-donor and a formaldehyde-acceptor, characterized in that the formaldehyde-donor is a methylolmelamine condensate containing as a major component 3 to 8 oligomers of a methylolmelamine.

The rubber component may be any of the natural and synthetic rubbers such as polybutadiene, polyisoprene, styrene-butadiene copolymer, butadiene-acrylonitrile copolymer, and their mixtures.

The formaldehyde-donor to be used in the vulcanizable rubber composition is a methylolmelamine condensate, which may be produced by condensing at least one methylolmelamine in an aqueous medium at a temperature of 0° to 100°C, preferably 50° to 100°C and most preferably 70° to 90°C, within a pH range of 5 to 8. The term "methylolmelamine" is intended to mean a melamine substituted with at least one methylol group at the N-position(s) (in the three amino groups). Examples of the methylolmelamine are dimethylolmelamine, trimethylolmelamine, tetramethylolmelamine, etc. In the condensation for preparation of the methylolmelamine condensate, the concentration of the methylolmelamine in an aqueous medium may be from 5 to 60%, preferably 20 to 40% by weight. The control of the pH may be effected by the addition of an organic or inorganic acid, preferably formic acid or acetic acid. The condensation may be carried out until the viscosity of the reaction mixture reaches 300 to 500 c.p., usually about 400 c.p., whereby the methylolmelamine condensate containing as a major component 3 to 8 oligomers, preferably 3 or 4 oligomers (i.e. trimer or tetramer) of the methylolmelamine, is obtained.

The methylolmelamine condensate is normally employed in a dry powder form and may be used in an amount of 0.1 to 10 parts by weight, favorably 2 to 4 parts by weight, per 100 parts by weight of the rubber component.

As the formaldehyde-acceptor, there may be used resorcinol or its reaction product with formaldehyde, usually in an amount of 0.1 to 10 parts by weight, preferably 2 to 4 parts by weight, per 100 parts by weight of the rubber component.

The vulcanizable rubber composition of the invention may contain, in addition to the said components, any other additive such as a vulcanizing agent, a reinforcing filler or the like.

The vulcanizable rubber composition may be formulated according to a conventional procedure, for example, by the use of a roll or Banbury mixer.

The reinforcing material may be natural fibers (e.g. cotton), synthetic fibers (e.g. nylon, vinylon, polyester), steel cords and the like. It may be pre-treated with any suitable adhesive such as RFL liquor, if necessary. In the case of steel cords, they may be pre-treated with suitable metals such as brass and zinc.

The adhesion with the vulcanizable rubber composition and the reinforcing materials as well as the vulcanization may be carried out in a conventional manner.

The present invention will be illustrated with reference to the following examples and reference examples, which are only given for the purpose of illustration and are not to be interpreted as limiting. In these examples, parts and % are by weight.

REFERENCE EXAMPLE 1

Preparation of trimethylolmelamine condensates:

To a vessel equipped with a reflux condenser and a stirrer were added 2,680 g of 37% commercial formalin (HCHO: 33 moles), and the pH was adjusted to 8.5 with about 0.3 ml of 10 N sodium hydroxide solution. Then, 1,260 g (10 moles) of melamine were added and dissolved therein by heating, followed by cooling down to 60° to 70°C. The solution was adjusted to pH 7 to 8 with the addition of a small amount of formic acid and then kept at 70° to 90°C. When the viscosity of the solution reached about 400 c.p., about 1.2 ml of 10 N sodium hydroxide solution were added thereto to make pH 10.0. Measurement of the condensation degree on gel permeation chromatography (GPC) showed that the solution contained as a major component a trimer and a tetramer. The solution (3,580 g) was spray-dried at about 250°C, and the resulting particles were passed through a sieve of 100 mesh to obtain 1,950 g of the white powdery product (hereinafter referred to as "compound (A)"). By the GPC test, the product was found to contain as a major component trimethylolmelamine condensates essentially consisting of a trimer and a tetramer in a ratio of about 1 : 2 by weight without any trimethylolmelamine monomer. Other analytical values are shown below:

C: 34.00%
H: 5.00%
N: 40.90%
Methylol group: 33.5%
Methylene group: 5.0%
Free formaldehyde: 0.1%
Total formaldehyde: 43.2%
Methylol group/melamine: 2.22 moles
Methylene group/melamine: 0.73 mole

REFERENCE EXAMPLE 2

Preparation of dimethylolmelamine condensates and trimethylolmelamine condensates:

In the same manner as in Reference Example 1 but using formalin in the amount corresponding to 22 moles or 44 moles of HCHO, there were prepared methylolmelamine condensates containing as a major component dimethylolmelamine or tetramethylolmelamine in the dry powder form. The methylolmelamine condensates thus obtained are hereinafter referred to as "compound (B)" and "compound (C)", respectively. Their analytical values are shown in Table 1.

Table I

| Monomeric methylolmelamine | Compound (B) Dimethylolmelamine | Compound (C) Tetramethylolmelamine |
|---|---|---|
| Main condensation degree (oligomer) | 4 – 6 | 3 – 4 |
| Methylol group (%) | 22.7 | 44.1 |
| Methylene group (%) | 6.7 | 4.2 |
| Total formaldehyde (%) | 36.4 | 51.7 |
| Methylol group/melamine (mole) | 1.25 | 3.31 |
| Methylene group/melamine (mole) | 0.82 | 0.7 |
| N (%) | 49.2 | 36.1 |

EXAMPLE 1

Six natural rubber compositions as shown in Table 2 were formulated on a 10 inch roll. Resorcinol was compounded at a roll temperature of 115°C, and the other ingredients were compounded at a roll temperature of 60°C. The adhesiveness between each rubber composition thus obtained and a crude nylon cord (1,260 d/2) was examined according to the method described in India Rubber World, Vol. 114, March, pages 213 – 219, 1946. The vulcanization was carried out at 140°C for 40 minutes. The results are shown in Table 2 wherein the values indicate the averages of the bond strengths obtained with 18 test pieces.

Table 2

| Ingredient | No. | Present invention | | | Control (Parts) | | |
|---|---|---|---|---|---|---|---|
| | | 1 | 2 | 3 | 4 | 5 | 6 |
| Natural rubber | | 100 | 100 | 100 | 100 | 100 | 100 |
| Stearic acid | | 2 | 2 | 2 | 2 | 2 | 2 |

Table 2-continued

| Ingredient | | No. Present invention 1 | 2 | 3 | (Parts) Control 4 | 5 | 6 |
|---|---|---|---|---|---|---|---|
| HAF Black | | 50 | 50 | 50 | 50 | 50 | 50 |
| Process oil | | 4 | 4 | 4 | 4 | 4 | 4 |
| Zinc oxide | | 5 | 5 | 5 | 5 | 5 | 5 |
| Sulfur | | 2.5 | 2.5 | 2.5 | 2.5 | 2.5 | 2.5 |
| N-Cyclohexylbenzo-thiazylsulfenamide | | 0.5 | 0.5 | 0.5 | 0.5 | 0.5 | 0.5 |
| Resorcinol | | 2.2 | 2.2 | 2.2 | 2.2 | 2.2 | 0 |
| Formaldehyde-donor | Compound (A) | 2.5 | | | | | No addition |
| | Compound (C) | | 2.5 | | | | |
| | Tetramethylolmelamine dimethyl ether | | | 2.5 | | | |
| | Trimethylolmelamine | | | | 2.5 | | |
| | Hexamethylolmelamine hexamethyl ether | | | | | 2.5 | |
| Bond strength (H-test: Kg) | | 12.3 | 12.6 | 11.0 | 6.3 | 7.8 | 2.5 |

EXAMPLE 2

The rubber compositions as shown in Table 3 were compounded at 120° to 130°C on a Banbury mixer (capacity, 1.8 L). Vulcanization was carried out at 140°C for 40 minutes. The adhesion test was carried out in the same manner as in Example 1. The results are shown in Table 3.

On compounding, the ingredients other than the formaldehyde-donor and the formaldehyde-acceptor were added in the conventional order, and the said two components were added finally; thereafter the mixture was compounded for 2 minutes. The total compounding time was 7 minutes.

The adhesiveness between the rubber component and a brass-plated steel tire cord (7 × 4 × 0.007 inches)

Table 3

| Ingredient | | No. Present invention 7 | 8 | 9 | (Parts) Control 10 | 11 | 12 |
|---|---|---|---|---|---|---|---|
| Natural rubber | | 100 | 100 | 100 | 100 | 100 | 100 |
| Stearic acid | | 2 | 2 | 2 | 2 | 2 | 2 |
| HAF Black | | 50 | 50 | 50 | 50 | 50 | 50 |
| Process oil | | 4 | 4 | 4 | 4 | 4 | 4 |
| Zinc oxide | | 5 | 5 | 5 | 5 | 5 | 5 |
| Sulfur | | 2.5 | 2.5 | 2.5 | 2.5 | 2.5 | 2.5 |
| N-Cyclohexylbenzo-thiazylsulfenamide | | 0.5 | 0.5 | 0.5 | 0.5 | 0.5 | 0.5 |
| Resorcinol | | 2.2 | 2.2 | 2.2 | 2.2 | 2.2 | 0 |
| Formaldehyde-donor | Compound (A) | 2.5 | | | | | No addition |
| | Compound (C) | | 2.5 | | | | |
| | Tetramethylolmelamine dimethyl ether | | | 2.5 | | | |
| | Trimethylolmelamine | | | | 2.5 | | |
| | Hexamethylolmelamine hexamethyl ether | | | | | 2.5 | |
| Bond strength (H-test: Kg) | | 11.8 | 12.0 | 7.0 | 5.2 | 8.5 | 2.4 |

EXAMPLE 3

The rubber compositions as shown in Table 4 containing as a rubber component SBR No. 1500 ("Sumitomo SBR 1500", a registered trademark of Sumitomo Chemical Company, Limited) were formulated at 120° to 130°C on a Banbury mixer (capacity, 1.8 L).

was examined according to the method described in ASTM D-2229-1968. The rate of pulling was 150 mm/min. Vulcanization was carried out at 150°C for 40 minutes.

As is clearly shown in Table 4 where the values indicate the averages of the bond strengths obtained with 18 test pieces, the present invention realizes an excellent adhesion even with the high temperature compounding on a Banbury mixer.

Table 4

| No.<br>Ingredient | | Present invention | | | Control (Parts) | | |
|---|---|---|---|---|---|---|---|
| | | 13 | 14 | 15 | 16 | 17 | 18 |
| SBR No. 1500 | | 100 | 100 | 100 | 100 | 100 | 100 |
| Stearic acid | | 1 | 1 | 1 | 1 | 1 | 1 |
| SRF Black | | 70 | 70 | 70 | 70 | 70 | 70 |
| JSR aroma | | 10 | 10 | 10 | 10 | 10 | 10 |
| Zinc oxide | | 5 | 5 | 5 | 5 | 5 | 5 |
| Sulfur | | 2 | 2 | 2 | 2 | 2 | 2 |
| Benzothiazole disulfide | | 1 | 1 | 1 | 1 | 1 | 1 |
| Diphenylguanidine | | 0.4 | 0.4 | 0.4 | 0.4 | 0.4 | 0.4 |
| Bonding agent R-6[1] | | 3 | 3 | 3 | 3 | 3 | 0 |
| Formaldehyde-donor | Compound (A) | 2.5 | | | | | No addition |
| | Compound (B) | | 2.5 | | | | |
| | Tetramethylolmelamine | | | 2.5 | | | |
| | Trimethylolmelamine dimethyl ether | | | | 2.5 | | |
| | Tetramethylolmelamine tetramethyl ether | | | | | 2.5 | |
| Bond strength (Kg) | | 175 | 165 | 100 | 130 | 115 | 90 |

Note:
[1] Bonding agent R-6 (resorcinol-formaldehyde condensate, a registered trademark of Uniroyal Co., Ltd.)

EXAMPLE 4

Rubber compositions as shown in Table 5 were formulated in the same procedure as in Example 1 using chloroprene rubber (Denka Neoprene WRT, a registered trademark of Denki Chemical Co., Ltd.). The adhesiveness between each chloroprene rubber composition thus obtained and RFL-treated rayon cord (1,650 d/2) was examined in the same manner as in Example 1. Vulcanization was carried out at 140°C for 20 minutes. The results are shown in Table 5.

Table 5

| No.<br>Ingredient | | Present invention | Control (Parts) | |
|---|---|---|---|---|
| | | 19 | 20 | 21 |
| Neoprene WRT | | 100 | 100 | 100 |
| SRF Black | | 30 | 30 | 30 |
| Stearic acid | | 1 | 1 | 1 |
| Paraffine wax | | 2 | 2 | 2 |
| Magnesium oxide | | 4 | 4 | 4 |
| Zinc oxide | | 5 | 5 | 5 |
| Softening agent (Sundex 790) | | 10 | 10 | 10 |
| Diethylthiourea | | 1 | 1 | 1 |
| Resorcinol | | 2 | 2 | 0 |
| Formaldehyde-donor | Compound (B) | 1 | | No addition |
| | Hexamethylolmelamine hexamethyl ether | | 1 | |
| Bond strength (H-test: Kg) | | 7 | 4 | 2 |

What is claimed is:

1. A vulcanizable rubber composition having improved adhesion properties comprising a diene rubber component, a methylolmelamine condensate formaldehyde-donor consisting essentially of 3 to 8 oligomers of a methylolmelamine, said methylolmelamine condensate being prepared by condensing at least one methylolmelamine selected from the group consisting of dimethylolmelamine, trimethylolmelamine and tetramethylolmelamine at a temperature of 0° to 100°C. and at a pH of 5 to 8 in an aqueous medium until the viscosity of the reaction mixture in the aqueous medium is from 300 to 500 cp, and a formaldehyde-acceptor selected from the group consisting of m-disubstituted benzenes and reaction products thereof with aldehyde compounds.

2. The vulcanizable rubber composition according to claim 1, wherein said formaldehyde-acceptor is resorcinol, m-aminophenol, m-cresol, or m-phenylenediamine or a reaction product thereof with formaldehyde or acetaldehyde.

3. The vulcanizable rubber composition according to claim 1, wherein the amount of the formaldehyde-donor is 0.1 to 10 parts by weight based on 100 parts by weight of the rubber component.

4. The vulcanizable rubber composition according to claim 1, wherein the formaldehyde-acceptor is resorcinol or its reaction product with formaldehyde.

5. The vulcanizable rubber composition according to claim 1, wherein the amount of the formaldehyde-acceptor is 0.1 to 10 parts by weight based on 100 parts by weight of the rubber component.

6. A method for adhering reinforcing materials to rubber simultaneously with vulcanization, which comprises contacting a reinforcing material with the vulcanizable rubber composition according to claim 1 under vulcanization conditions.

7. The vulcanizable rubber composition according to claim 1, wherein said methylolmelamine condensate is prepared by condensing at least one of said methylolmelamines at a temperature of 50° to 100°C. and at a pH of 5 to 8 in an aqueous medium.

8. The vulcanizable rubber composition according to claim 1, wherein said methylolmelamine condensate is prepared by condensing at least one of said methylolmelamines at a temperature of 70° to 90°C. and at a pH of 5 to 8 in an aqueous medium.

9. The vulcanizable rubber composition according to claim 1, wherein the concentration of the methylolmelamine to be condensed in the aqueous medium is from 5 to 60% by weight.

10. The vulcanizable rubber composition according to claim 7, wherein the concentration of the methylolmelamine to be condensed in the aqueous medium is from 20 to 40% by weight.

11. The vulcanizable rubber composition according to claim 3, wherein said methylolmelamine condensate is present in said composition in dry powder form.

* * * * *